United States Patent
Grady

[11] 3,878,493
[45] Apr. 15, 1975

[54] INDUCTION WATTHOUR METER POTENTIAL COIL MOUNTING

[75] Inventor: James J. Grady, Somersworth, N.H.

[73] Assignee: General Electric Company, Schenectady, N.Y.

[22] Filed: June 24, 1974

[21] Appl. No.: 482,224

[52] U.S. Cl. ............................................... 336/197
[51] Int. Cl. ............................................. H01f 27/30
[58] Field of Search ............ 336/197, 210; 324/137, 324/138; 310/214; 335/250

[56] References Cited
UNITED STATES PATENTS

| | | | |
|---|---|---|---|
| 1,623,426 | 4/1927 | Mallory | 336/210 X |
| 1,964,464 | 6/1934 | Goff | 336/197 X |
| 2,587,097 | 2/1952 | Berlant | 336/210 X |

Primary Examiner—Thomas J. Kozma
Attorney, Agent, or Firm—Vale P. Myles

[57] ABSTRACT

An induction watthour meter electromagnet assembly of the type including a core piece with a center winding leg, two outer legs joined to the center leg at a top end by a yoke member and forming air gaps with a flux pole of the center leg at the bottom end, a pole piece mounted on the bottom ends of the outer legs and extending under the flux pole, a potential coil mounted on the center leg, and a rigid stop for preventing movement of the bottom face of the coil; the assembly is provided with a cantilever-mounted leaf spring fixed to the side of the yoke and having a tongue curving down and outward to press down upon the top face of the coil.

4 Claims, 2 Drawing Figures

INDUCTION WATTHOUR METER POTENTIAL COIL MOUNTING

BACKGROUND OF THE INVENTION

The present invention relates generally to induction watthour meters and particularly to the mounting of a potential coil in a potential electromagnet assembly thereof.

The driving mechanism of an induction watthour meter is essentially an electrical induction motor formed by a flat metal rotor disc rotating on a drive shaft and with its outer portion passing between the poles of two opposing electromagnet assemblies; one electromagnet assembly is referred to as the current electromagnet assembly and the other as the potential electromagnet assembly.

The potential electromagnet assembly generally includes an E-shaped laminated ferromagnetic core having two outer leg portions, a center winding leg portion, and a yoke portion joining the legs at a top end. A pole piece is secured to the bottom end of the winding leg and forms air gaps with the bottom ends of the outer legs. A potential coil winding is mounted on the center leg for generating a magnetic field at the pole piece in quadrature with the input voltage of the meter. This field, in cooperation with another field generated by the current electromagnet assembly in phase with the current through the meter, drives the rotor.

The accuracy of an assembled meter is determined by a calibration process by which compensation is made for certain variations in the meter which affect the speed of the rotor in relation to the electrical power passing through the meter. One important such variation is the position of the potential coil relative to the air gaps of the core.

The potential coil is generally a sealed coil unit, with the spool and windings potted in a plastic resin. The coil unit can, after mounting on the core, undergo changes in dimensions in response to temperature or humidity variations and, if not properly fixed in place, can shift position on the center leg as a result of such dimensional changes or of vibration shocks. If the result is a shifting of the bottom of the coil relative to the air gaps after calibration has been completed, the meter is likely to be inaccurate.

The problem of fixing the potential coil on the center leg has been approached previously by providing spring pressure between the yoke and the top face of the coil to hold the coil against a rigid stop at its bottom face. Thus the position of the bottom coil face relative to the air gaps is fixed, and any dimensional changes of the coil result in movement of the top face relative to the yoke, which has an insignificant effect on the accuracy of the meter. The spring means also prevents positional shifts due to vibration shocks. Examples of potential electromagnet assemblies comprising such spring means, as well as discussions of their function are provided in the U.S. Pat. Nos.

3,706,061 issued 12 Dec. 1972 to Loika, Jr. and
3,792,353 issued 12 Feb. 1974 to Loika, Jr., both assigned to the same assignee as is the present invention. The spring structures there described do, however, have certain disadvantages.

The first-cited patent describes a U-shaped spring member wedged between the top face of the coil and the bottom of the yoke. A disadvantage of such an arrangement is that it requires excess clearance between the yoke and the top coil face, thus increasing the length of the assembly. This is an important consideration, since space is at a premium in such meters.

The second-cited patent describes a leaf-spring mounted at its ends in recesses of end members secured to the yoke. Such an arrangement requires at least three special parts, the spring and the two end holding members, all of which must be manufactured to relatively tight dimension tolerances. Moreover, the assembly of such a spring arrangement is relatively difficult, and has not been found to readily lend itself to automated assembly.

While the above shortcomings of previous spring arrangements may at first seem rather minor to a person not closely associated with the manufacture of watthour meters, they are in fact important. Because of the large number of such meters, on the order of millions, manufactured each year, a savings of only a fraction of a cent in the cost of production per meter can be a significant factor in commercial competition.

SUMMARY OF THE INVENTION

In accordance with the present invention a leaf spring is provided which has a flat, elongated metal sheet portion rigidly held at its ends against the side face of the yoke and a tongue portion extending generally toward the top face of the coil from the spring base portion and curving outward from the general plane of the base portion, so that its outer portion resiliently presses on the top face of the coil in cantilever fashion.

With the present invention, no excess clearance is needed between the top face of the coil and the bottom of the yoke, only a single additional, easily manufactured part is required in the assembly to provide the spring means, and the assembly of the spring to the remaining assembly readily lends itself to automated methods.

DESCRIPTION OF THE PREFERRED EMBODIMENT

Figure 1:
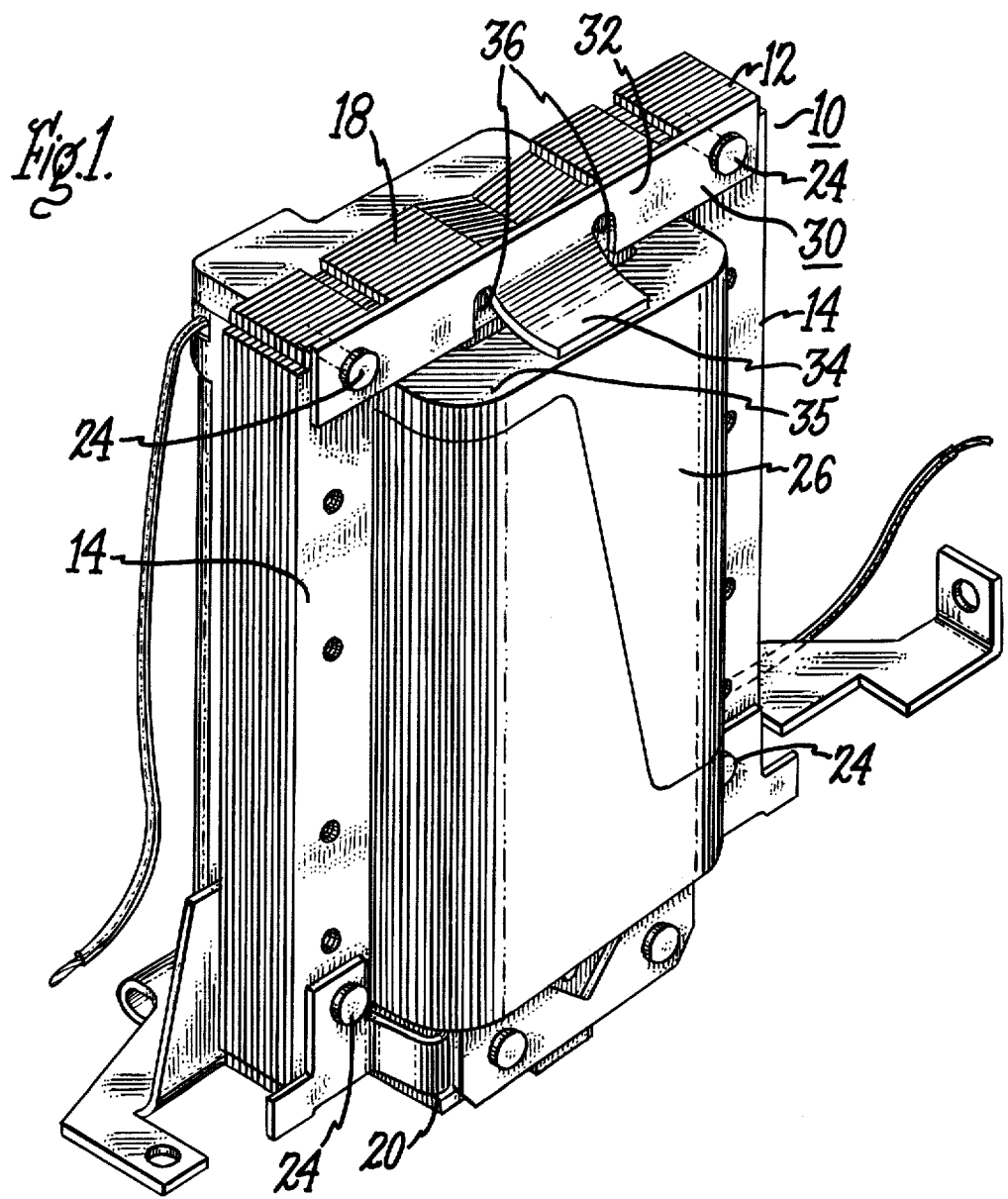
FIG. 1 shows a potential electromagnet assembly for a single phase watthour meter in accordance with a preferred embodiment of the present invention.
Figure 2:
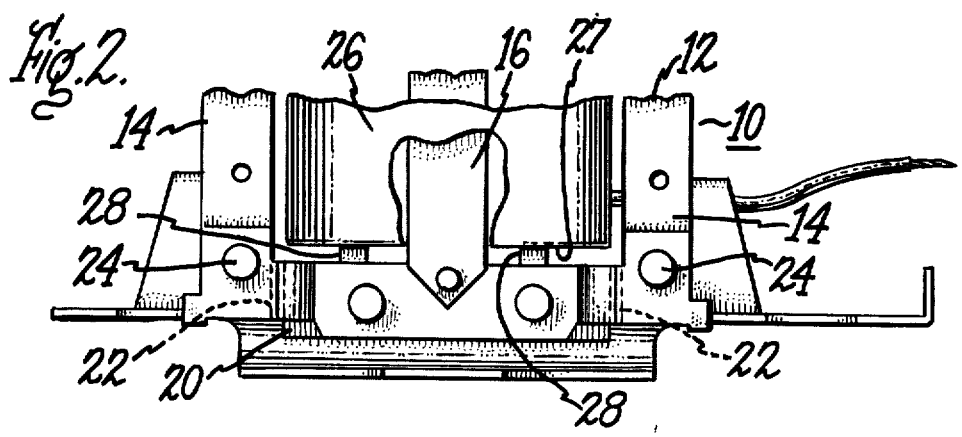
FIG. 2 is a side, partly broken away view of the lower portion of the assembly of FIG. 1.

A single phase induction watthour meter potential electromagnet assembly 10 in accordance with the preferred embodiment of the present invention is shown in FIGS. 1 and 2 of the drawings. The same reference numerals are used in the FIGS. 1 and 2. The assembly includes an E-shaped laminated ferromagnetic core 12 with the two outer leg portions 14 and a center leg portion 16, with their top ends joined by a yoke portion 18. Fixed to the bottom of the winding leg is a laminated pole piece 20, the sides of which form air gaps 22 with the sides the outer leg 14 ends. The laminates of both the core 12 and the pole piece 20 are fastened together by aluminum alloy rivets 24.

Mounted on the center leg 16 is a potential coil 26, which is a sealed unit including a spool and windings encapulated in a polyamide resin. The bottom face 27 of the coil 26 is provided with two bosses 28, shown in FIG. 2 which abut the top of the pole piece 20 to act as a stop means for limiting the movement of the bottom face 27 of the coil 26 toward the air gaps 22.

Fastened to the side of the yoke 18 is a cantilever-mounted leaf spring 30. The spring 30 is a single piece of stainless steel sheet fifteen thousandths of an inch thick having a rectangular base portion 32 about ¼ inch wide and 1 11/16 inch long provided with holes at each end for fastening by the core lamination rivets 24, and a rectangular tongue portion 34 about 7/16 inch wide and ⅜ inch long which extends downwardly and outward from the side of the yoke 18 with its end resiliently contacting the top face 35 of the coil 26 to hold it firmly in place.

With the assembly 10 of the preferred embodiment, only a single part added to the remaining assembly will provide the spring function. The spring 30 can be readily formed by stamping from metal sheet, prebending the tongue 34 out somewhat, and securing the spring 30 to the yoke 18 by the rivets 24, which are generally already a part of the assembly 10. Moreover, the assembling of the spring 30 to the yoke 18 can be readily automated, and neither the location nor the dimensional tolerance of the spring 30 are particularly critical.

In the spring 30 of the preferred embodiment, additional resilience of the tongue 34 is gained by providing recesses 36 on each side of the base portion 32 where the tongue 34 joins it. This adds to the cantilever spring action of the tongue 34 itself some of the torsion spring characteristic of the base portion 32 as it is pulled away pressure the yoke 18 on the tongue 34 side by outward presssure from the tongue 34.

While in the assembly of the preferred embodiment the stop means for the bottom face 27 of the coil 26 were bosses 28 of encapsulation material, other means for limiting the movement of the bottom face 27 of the coil 26 relative to the air gaps 22 may be provided. For example, the coil 26 may be secured to the center leg 16 near its bottom face 27 by bosses on the core or by an adhesive. The use of adhesives, however, has the drawbacks of requiring a setting time for the adhesive and involving the risk of adhesive particles contaminating other delicate machinery of the meter during or after the assembly process of the meter. The particular configuration of stop means is immaterial, so long as it acts to position accurately the bottom face 27 of the coil 26.

I claim:

1. An induction watthour meter electromagnet assembly of the type including:

a ferromagnetic core piece having a central winding leg and a pair of parallel outer legs, all joined at one end by a yoke having side faces, said central winding leg having a flux pole at its other end and the other ends of said outer legs forming air gaps with said flux pole, a pole piece mounted on the other end of said central winding leg and extending under said flux pole, a potential coil having top and bottom faces mounted on said central winding leg, a rigid stop for preventing movement of said bottom face of said coil along said winding leg toward said air gaps, and a spring contacting the top face of said coil to resiliently force said bottom face against said stop, wherein the improvement comprises said spring, comprising:

a flat, elongated metal sheet base portion rigidly held at its ends against one side face of said yoke member, and a tongue portion extending generally toward the top face of said potential coil from said base portion and curving outward from the general plane of said base portion, the outer portion of said tongue resiliently pressing on said top face of said coil in cantilever fashion.

2. The assembly defined in claim 1 wherein said base portion of said spring includes a recess at each side of said tongue where it joins said base portion.

3. The assembly defined in claim 2 wherein said tongue is generally rectangular.

4. The assembly defined in claim 1 wherein the ends of said base portion are provided with openings, through which pass fastening means for fastening said base portion to said yoke and also for fastening together laminates of said yoke.

* * * * *